Nov. 13, 1962  E. M. PFAUSER  3,063,226
SELF-PROPELLED POWER MOWER
Filed Oct. 24, 1960  2 Sheets-Sheet 1

INVENTOR.
Edward M. Pfauser
BY
Lieber, Lieber & Nilles
Attorneys

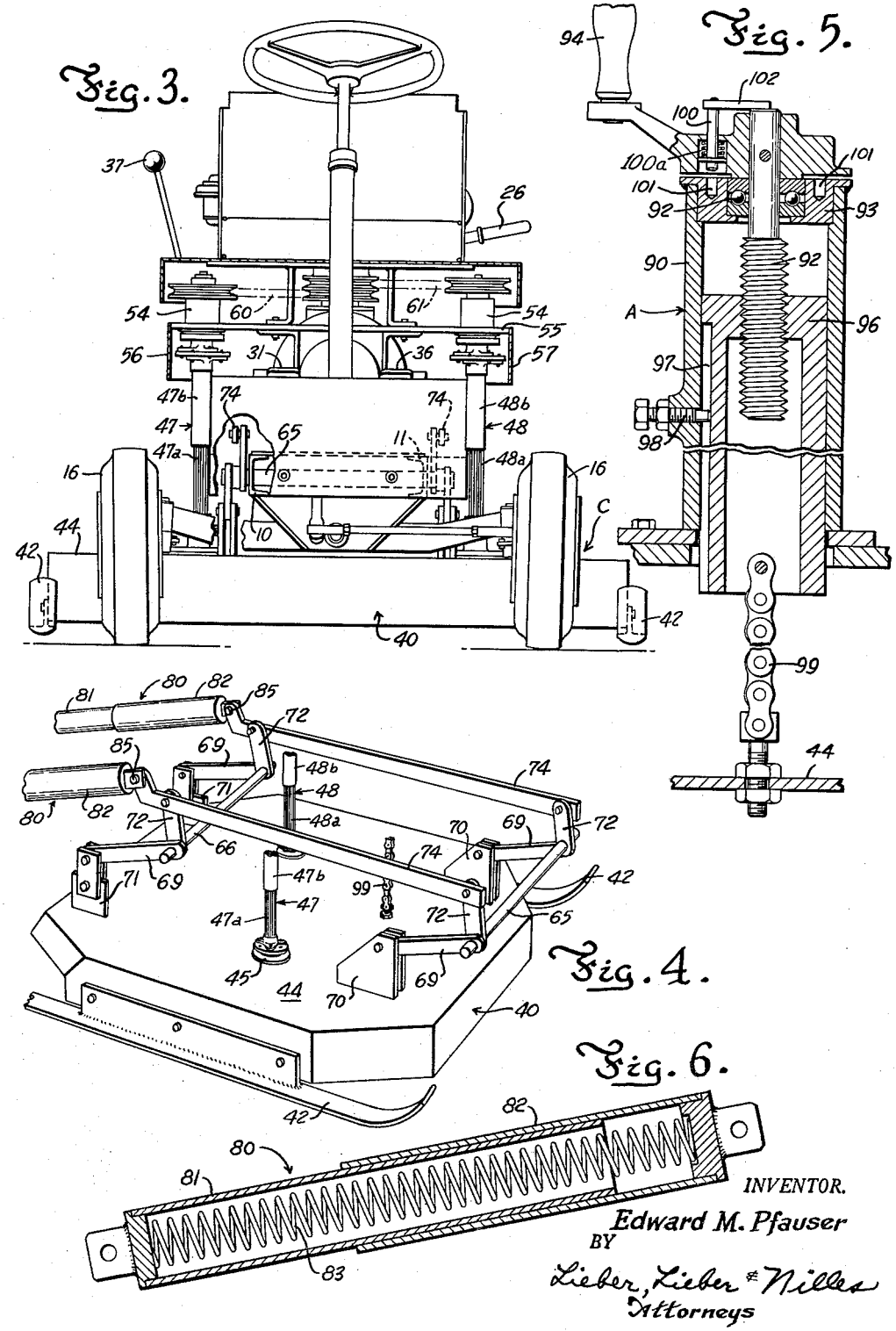

United States Patent Office 3,063,226
Patented Nov. 13, 1962

3,063,226
SELF-PROPELLED POWER MOWER
Edward M. Pfauser, Elm Grove, Wis., assignor to Hal-Gan Products, Inc., Elm Grove, Wis., a corporation of Wisconsin
Filed Oct. 24, 1960, Ser. No. 64,479
2 Claims. (Cl. 56—25.4)

This invention relates to a self-propelled mower of the type which has the cutting unit mounted midships. More particularly, the invention relates to improved mounting means, drive mechanism and height adjusting mechanism for operatively connecting the cutting unit on the main frame of the self-propelled vehicle.

In mowers of this type it is desirable to permit the cutting unit to quickly rise when an obstruction is encountered but at the same time the cutting unit should not cut unevenly across the swath, or gouge one side while creating a high spot on the other. Furthermore, it is important that a predetermined minimum cutting height be established and below which height the cutting unit will not go; on the other hand, it is desirable that the cutting unit be free to rise immediately on encountering an obstruction but at the same time this upward movement of the cutter should not result in an uneven cut across the width of the swath.

Accordingly the present invention provides a cutting unit for a self-propelled vehicle, which unit can be readily adjusted so as to provide a predetermined cutting height and the mounting of the unit is such that it will rise and fall in parallel relationship to the tractor on which it is mounted. The unit is furthermore mounted by means which permits it to immediately rise in parallel relationship with the tractor upon striking an obstacle, and the drive means as well as the vertical adjusting means is constructed so as to accommodate this movement in the upward direction.

Another more specific object of the present invention is to provide an improved parallel arm linkage arrangement which permits the cutting unit to rise and fall in parallel relationship with the tractor. This parallel relationship with the tractor is not only established in a fore and aft direction but also in a transverse direction relative to the tractor. As a result, as the tractor moves over the crop to be cut, the cutting unit will rise and fall in parallel relationship to the tractor and consequently in parallel relationship to the ground over which the vehicle traverses. The unit will cut parallel to the general terrain regardless of the undulations or inclination of the ground.

Resilient means are connected between the tractor frame and the improved parallel linkage, which means tends to urge the unit in the upward direction and thereby relieve the majority of the weight of the unit. The unit is lowered by gravity to the working position but a majority of its weight is counterbalanced by the resilient means and as a result the unit is responsive to immediate rise in the upward direction upon striking an obstacle. The parallel linkage arrangement is formed as a single unit across the width of the machine as well as in a longitudinal direction to insure that the cutting unit rises across its width and length in parallel relationship to the tractor. This movement prevents one corner or the other of the unit from rising or falling faster than the others and permits the drive shafts to be in continuous operation with no binding thereof, regardless of the vertical position of the unit.

These and other objects and advantages will appear hereinafter as this disclosure progresses, reference being had to the accompanying drawings in which:

FIGURE 3 is a front view of the mower shown in FIGURES 1 and 2, certain parts being shown in section or broken away;

FIGURE 4 is a perspective view of the cutting unit, mounting means, and drive means for the unit shown in the above figures;

FIGURE 5 is a fragmentary, vertical sectional view through the adjusting mechanism, the view being taken on line 5—5 of FIGURE 2 but on an enlarged scale; and FIGURE 6 is a longitudinal sectional view through one of the spring-strut units, the view being taken along line 6—6 of FIGURE 2 but on an enlarged scale.

Figure 1:
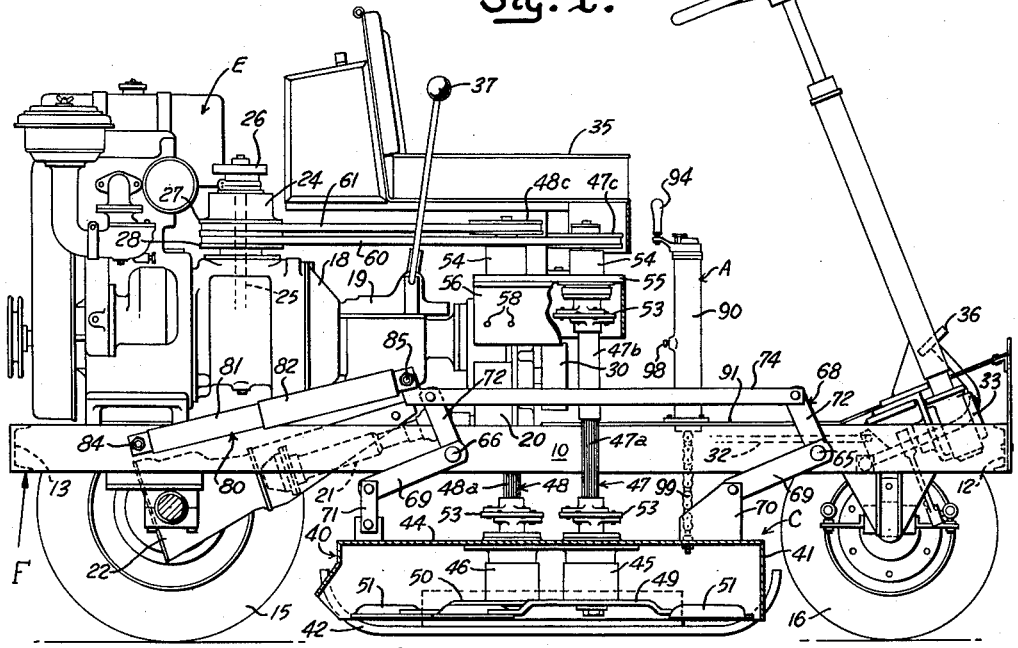
FIGURE 1 is a side elevational view of a self-propelled mower embodying the present invention, certain parts being shown in section, broken away, or removed for the sake of clarity in the drawings.

Referring in greater detail to the drawings, the main frame F of the machine is comprised of two side members 10 and 11 which extend in a front and rear direction or longitudinally of the vehicle. These members are connected at the front ends 10a and 11a, respectively, by the cross member 12 and at their rear ends 10b and 11b, respectively, by the cross member 13. All of these frame members may be formed of channel iron as shown and suitably connected together, for example as by welding. A pair of rear traction wheels 15 and a pair of front steering wheels 16 support the vehicle for travel over the ground and the main frame is thus held at a constant attitude relative to the ground over which it traverses. A conventional internal combustion engine E is mounted adjacent the rear portion of the frame and has a traction clutch 18 secured adjacent its front side. A transmission 19 is connected to the clutch and by means of which the tractor may be driven in either direction in the conventional manner through the speed reducer 20, main drive shaft 21 and then through the differential 22 connected to the rear drive wheels. A friction-type clutch 24 is also connected with the engine and is operatively connected with a shaft 25 for the cutting unit. Pulleys 27 and 28 are fixed to shaft 25. The friction clutch is manually engaged and disengaged by handle 26.

A conventional brake drum 30, operated by the foot pedal 31 through the linkage 32, is provided and as the above arrangement is conventional, a further detailed description is not deemed to be necessary.

The operator's seat 35 is located intermediate the length of the tractor and in a midship position where the operator can conveniently reach the clutch pedal 36, the brake pedal 31, transmission shift 37, the cutter clutch 26 and the means A for adjusting the vertical height of the cutter, now to be described.

Figure 2:
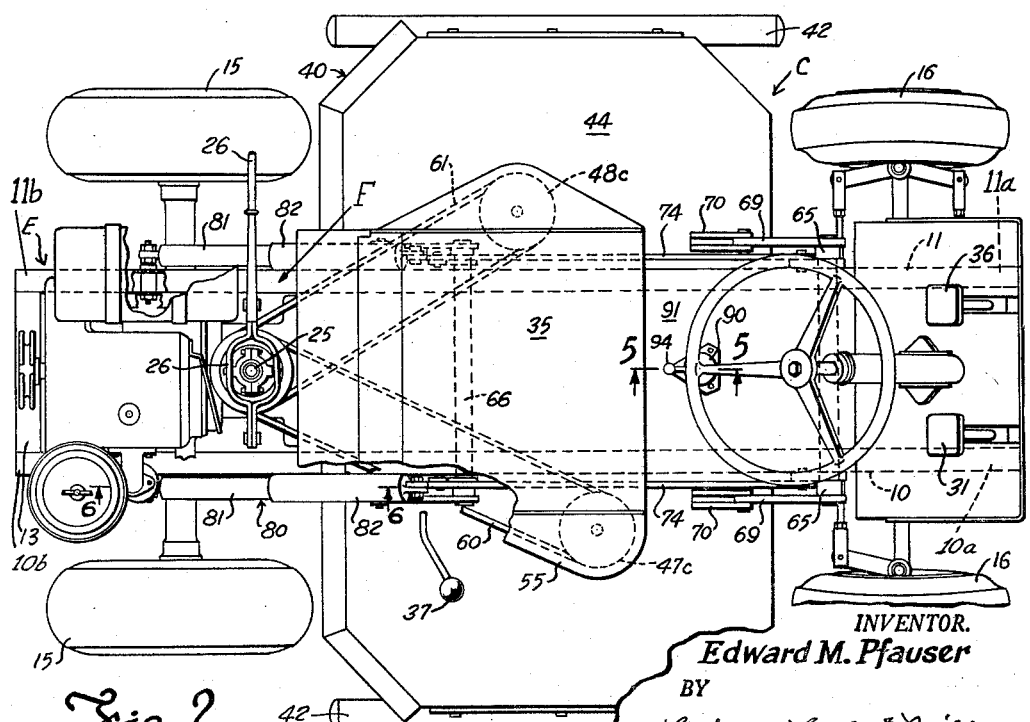
FIGURE 2 is a plan view of the mower shown in FIGURE 1, certain parts being shown as removed, or broken away for the sake of clarity.

The cutting unit C comprises a shroud or housing 40 which is generally rectangular in plan as viewed in FIGURE 2 and which extends laterally beyond the tread of the tractor. A pair of ground shoes 42 are secured to the housing, one at each side thereof and extend in a longitudinal direction. These shoes do not ordinarily touch the ground but in normal operation are held at a predetermined height from the ground, as will more fully appear. Secured to the top plate 44 of the housing are the drive shaft bearing assemblies 45 and 46, respectively. At the lowermost end of the drive shafts are the rotary arms 49 and 50, which arms carry cutting elements 51 at their outermost ends. The drive shafts are spaced from one another in a longitudinal direction and are also spaced apart sufficiently in a transverse direction so that the rotary paths defined by their cutting elements overlap one another to insure complete cutting coverage across the entire width of the swath. The cutting elements are also located a distance above the ground engaging shoes 42 so that injury to the cutting elements is precluded when an obstacle is engaged by the shoe and the cutting unit is thereby raised, as will appear.

The drive means between the frame and cutting unit are extensible and retractable. Stated otherwise, they are shiftable in the vertical direction to accommodate relative movement between the frame and unit and still be in drive transmitting condition regardless of the height of the unit to so accommodate vertical shifting of the unit. The drive shafts 47 and 48 are telescoping in nature and for this purpose the lower portions 47a and 48a have an external spline formed along their upper end. The upper portions 47b and 48b of the drive shafts are formed with an internal spline which slidably engage the spline end of the lower drive shaft portions. Both the lower and the upper drive shaft portions have a flexible coupling 53 for purposes that will more full appear later. The upper drive shaft portions are journalled in suitable anti-friction bearing assemblies 54 which are rigidly supported in the frame member 55. Frame member 55 comprises a horizontally disposed plate supported on the longitudinal frame members 56, 57, the latter in turn being rigidly secured to the transmission by bolts 58. Pulleys 47c and 48c are secured to the upper end of their respective shaft 47, 48. Drive belts 60 and 61 drivingly connect pulleys 28, 47c and 27, 48c, respectively. Thus the vertically extending shaft 25 furnishes power to the two vertically disposed drive shafts 47, 48 to thereby drive cutters 51 within the housing.

The telescoping drive shafts are freely extensible and contractible to accommodate vertical movement of the drive unit without interrupting the delivery of power thereto. The drive shafts also include a pair of flexible couplings, one at either end to accommodate the slight arcuate swinging of the unit as it is raised and lowered by means now to be described. In other words, although the unit rises and falls in parallelism with the tractor, some accommodation is made in the drive shaft to accommodate the slight longtiudinal shifting of the cutting unit in respect to the tractor as the unit is raised and lowered. These flexible couplings also accommodate any slight misalignment of the drive shafts due to a certain amount of looseness in the linkage system or due to a severe jar on one edge of the cutting unit, which may momentarily cause the cutting unit to twist relative to the main frame of the vehicle.

Mounting means are provided for the unit by means of which the latter is maintained in a parallel relationship to the vehicle frame regardless of the vertical position of the unit and while it is being raised and lowered. This mounting means comprises a parallel linkage arrangement as follows. A front jack shaft 65 and a rear jack shaft 66 are oscillatably journalled in the frame members 10 and 11 and extend from either side thereof. A bell crank 68 is fixed to each end of these transversely positioned jack shafts for oscillation therewith. The bell cranks are actually comprised of separate arms 69 and 72 fixed to the jack shafts. The generally horizontal and rearwardly extending arms 69 of these bell cranks are pivotally secured at their rear ends to their respective upstanding brackets 70, 71 fastened to the upper side of the housing 41. The upwardly extending arms 72 of the bell cranks are connected together at each side of the vehicle by the longitudinally extending tie rods 74. The tie rods 74 hold the front and rear shafts together for operation as a unit, and the transverse jack shafts 65 and 66 hold the bell cranks together in a transverse direction. Thus the improved parallel linkage insures that all four corners of the unit are raised and lowered in unison and the unit is raised and lowered uniformly throughout its width and length and relative to the tractor frame.

At each side of the tractor there is provided a resilient means in the form of a spring-strut unit 80, which means acts between the main frame of the tractor and the parallel linkage mechanism to thereby bias the rather heavy cutting unit upwardly. More specifically the spring-strut unit includes the tubular telescoping members 81 and 82, in which is mounted the compression spring 83. The tubular member 81 is secured at its rear end by bolt 84 to the tractor frame and the other tubular half 82 is secured at its front end to the parallel linkage mechanism by a pivot pin 85 located on the rear end of the tie rods. Thus the springs 83 act to urge the spring-strut unit to the extended position and the tie rods to the forward direction and consequently the bell cranks in a clockwise direction as viewed in FIGURE 1. A substantial portion of the weight of the cutting unit is counterbalanced by the spring-strut units, and consequently when an obstacle is encountered by the cutting unit no delay will be encountered in raising it. The unbalanced weight of the unit is sufficient so that gravity holds it in the working position but at the same time the unit is quickly responsive to obstacles. The vertically shiftable drive shafts also permit immediate vertical movement of the unit and without any binding in the drive.

Means are provided for lowering the unit to a predetermined and adjustable minimum depth, but this adjusting means does not prevent immediate release of the unit in the upward direction when an obstacle is encountered. The adjustable means to be described constitutes a one-way connection between the frame and the cutting unit, that is to say, the means is effective to forcibly raise the unit, but gravity lowers the unit to an extent determined by the adjustable means. This means has a flexible link forming a one-way connection which permits free upward movement of the unit when an obstacle is encountered.

The adjusting means chosen for illustrative purposes comprises a tubular member 90 which is rigidly secured at its lower end to the floor plate 91 of the vehicle. A threaded shaft 92 extends upwardly through the cap 93 fastened in the upper end of the tubular member and an operator's crank 94 is fixed to the top end of this shaft. Shaft 92 is journalled in an anti-friction bearing 92 carried in the cap 93. An internally threaded follower 96 is mounted within the tube and threadably engages member 92 so that rotation of the crank 94 in one direction or the other causes follower 96 to be raised or lowered within the tube. Follower 96 has an axial groove 97 formed along its periphery, and an anchor screw 98 extends through member 90 and is engaged in the groove 97 to prevent rotation of follower 96 as it reciprocates in the tube. A flexible link in the form of a roller chain 99 is secured to the lower end of follower 96 and to the top side of the housing 41.

To adjust the cutting height, the operator rotates the handle 94 in one direction to raise the entire cutting unit. The unit can be lowered by the operator to any desired cutting height by turning the handle 94 in the opposite direction and permitting the unit to lower by gravity. By this particular adjusting mechanism the cutting unit can be quickly lowered by gravity to the predetermined minimum cutting height and can also be quickly raised with the assistance of the spring-strut units. The flexible member 99 does not interfere with the raising of the unit when an obstacle is encountered and when the obstacle has been passed the unit again drops quickly to the minimum cutting height as established by the flexible link.

A latch and detent arrangement is provided at the upper end of the adjusting means to prevent the crank 94 from inadvertently turning while the device is in operation. This locking means comprises a resiliently loaded pin 100 which is engageable in any one of a series of vertically extending apertures 101 formed in the cap 93. The pin is biased in the downward direction by a spring 100a into engagement with one of the apertures and when the operator desires to turn the crank he must first grasp the lug 102 secured to the top end of the pin and turn it to a position where it rests on the top end of member 92 whereby the pin is held out of engagement with the apertures to permit free turning of the crank.

Summary

By means of the present invention a cutting unit has been provided which rises and falls in parallelism with the ground. The unit is mounted midships between the front and rear wheels so that the latter act as gauge wheels in averaging out the cutting height of the unit over uneven terrain. The invention provides a minimum cutting height which may be quickly adjustable and which permits the unit to float over the ground without any contact therewith. On the other hand, the drive mechanism and the height adjusting means are so constructed that the unit can respond immediately in the upper direction on encountering an obstacle. The improved parallel linkage insures bodily shifting of the entire cutting unit in a constant attitude relative to the tractor.

Various modes of carrying out the invention are contemplated as being within the scope of the following claims particularly pointing out and distinctly claiming the subject matter which is regarded as the invention.

What is claimed and desired to be secured by Letters Patent is:

1. In a self-propelled power mower having a wheel supported frame for movement over the ground, a cutter unit mounted at the underside of said frame and intermediate the length thereof, linkage mechanism connected between said frame and said unit for maintaining the unit parallel to the ground regardless of the height therefrom, vertically shiftable cutter drive means connected between said unit and frame and drivingly connecting said unit to said frame for any position of the unit and permitting free movement of the unit in the upward direction, and an adjustable one-way connection connected between said frame and unit for forcibly raising the latter and also permitting it to lower by gravity to a minimum height, said connection also permitting the unit to move freely in the upward direction upon striking an obstacle, said one-way connection comprising, a threaded shaft journalled for rotation on said frame but in an axially fixed position relative thereto, a follower threadably engaged with said shaft and reciprocable therealong, a flexible link connected between said follower and unit whereby rotation of said shaft causes vertical movement of said unit, said link establishing the minimum height of said unit whie permitting it to move freely in an upward direction.

2. A self-propelled power mower including a frame, ground engaging wheels adjacent the front and rear of said frame, a cutter unit carried at the underside of said frame and intermediate the length thereof; parallel arm linkage mechanism carried by said frame and for maintaining said unit parallel to the ground, said mechanism comprising, a pair of rockshafts oscillatably mounted on said frame and spaced apart from one another, a series of parallel arms secured to said shafts and pivotally connected to said unit, and means connecting said shafts together for oscillation as a unit; telescoping drive shafts connected between and rotatably mounted on said frame and said unit to permit free relative movement therebetween, and an adjustable one-way connection between said frame and said unit for vertically positioning the unit relative to the frame and permitting free upward movement of the unit, a threaded shaft journalled for rotation on said frame but in an axially fixed position relative thereto, a follower threadably engaged with said shaft and reciprocable therealong, a flexible link connected between said follower and unit whereby rotation of said shaft causes vertical movement of said unit, said link establishing the minimum height of said unit while permitting it to move freely in an upward direction.

References Cited in the file of this patent

UNITED STATES PATENTS

| | | |
|---|---|---|
| 2,763,977 | Spencer et al. | Sept. 25, 1956 |
| 2,862,343 | Wood | Dec. 2, 1958 |
| 2,882,977 | Smith et al. | Apr. 21, 1959 |
| 2,928,223 | Danuser | Mar. 15, 1960 |
| 2,949,004 | Jones | Aug. 16, 1960 |
| 2,968,902 | Brown | Jan. 24, 1961 |